United States Patent [19]

Omitsu

[11] 4,354,401
[45] Oct. 19, 1982

[54] AUTOMATIC TRANSMISSION FOR AUTOMOBILES

[75] Inventor: Takashi Omitsu, Troy, Mich.

[73] Assignee: Aisin Seiki Co., Ltd., Kariya, Japan

[21] Appl. No.: 143,896

[22] Filed: Apr. 25, 1980

[51] Int. Cl.³ ............................................. F16H 37/00
[52] U.S. Cl. ................................................. 74/689
[58] Field of Search ................. 74/866, 681, 689, 690, 74/691

[56] References Cited

U.S. PATENT DOCUMENTS

| | | | |
|---|---|---|---|
| 3,203,277 | 8/1965 | General | 74/681 |
| 3,203,278 | 8/1965 | General | 74/690 |
| 3,238,816 | 3/1966 | Schottler | 74/690 |
| 3,406,597 | 10/1968 | Perry et al. | 74/691 |
| 3,479,908 | 11/1969 | Kress et al. | 74/681 |
| 3,739,658 | 6/1973 | Scheiter | 74/730 |
| 4,107,776 | 8/1978 | Beale | 74/866 |

OTHER PUBLICATIONS

Conceptual Design Study of Improved Automotive Gas Turbine Power Train-Final Report-National Technical Information Service (report by DOE/NASA), pp. 30-34, published May 1979.

*Primary Examiner*—Lawrence J. Staab
*Attorney, Agent, or Firm*—Oblon, Fisher, Spivak, McClelland & Maier

[57] ABSTRACT

An automatic transmission for vehicles having an internal combustion engine and driving wheels which includes a continuously variable transmission device connected with an engine output for continuously variably transmitting a partial torque from the engine in accordance with the conditions of vehicle speed and degree of engine throttling, a counter shaft connected with the engine output and transmitting the remainder of the torque from the engine, a combiner gear mechanism receiving the torque from the engine through the counter shaft and the continuously variable transmission device, a fluid torque converter for converting torque from the gear mechanism and transmitting the torque to the driving wheels and a reverse drive mechanism interposed between the engine and the torque converter for reversely transmitting the torque from the engine to the driving wheels.

8 Claims, 10 Drawing Figures

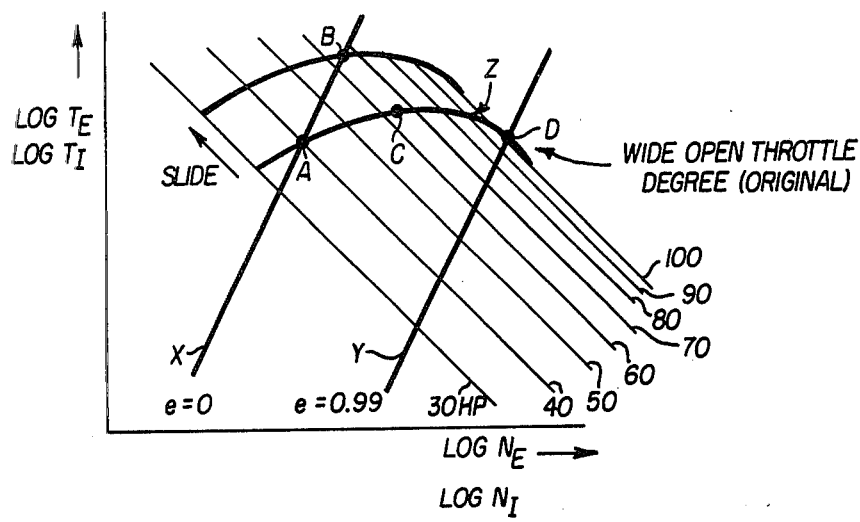
FIG. 1
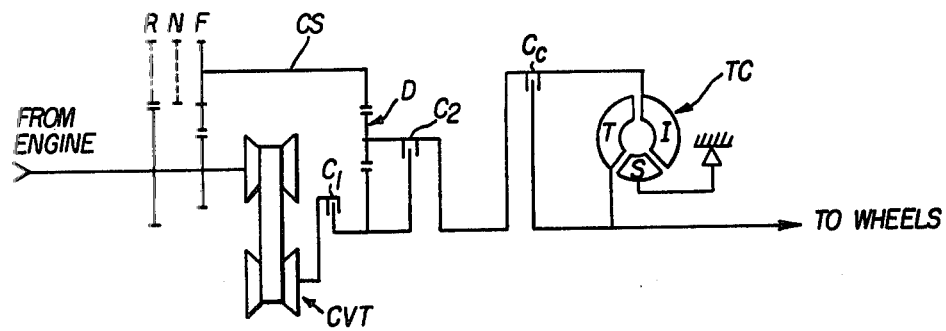
FIG. 2
|  | $C_1$ | $C_2$ | $C_c$ |
|---|---|---|---|
| P,N |  |  |  |
| F1 | 0 |  | (0) |
| FD |  | 0 | (0) |
| R |  | 0 |  |
FIG. 3

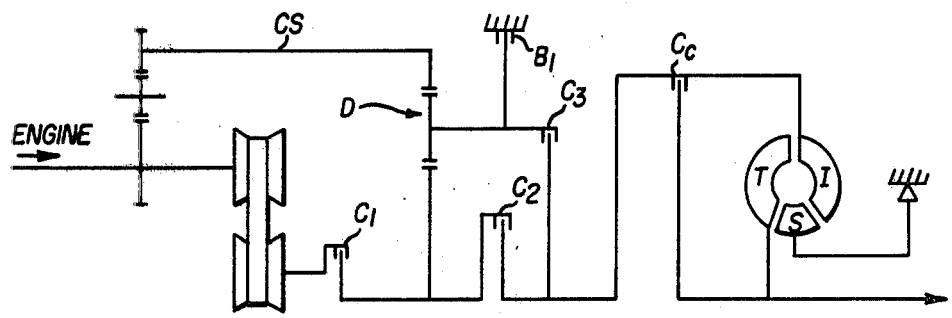
FIG. 7
|  | $C_1$ | $C_2$ | $C_3$ | $B_1$ | $C_c$ |
|---|---|---|---|---|---|
| N.P | 0 |  |  |  |  |
| $F_1$ | 0 |  | 0 |  |  |
| $F_2$ |  | 0 | 0 |  | (0) |
| R |  | 0 |  | 0 |  |
FIG. 8
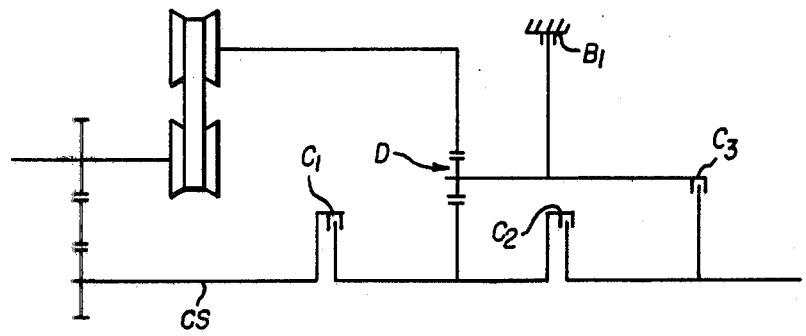
FIG. 9
|  | $C_1$ | $C_2$ | $C_3$ | $B_1$ | $C_c$ |
|---|---|---|---|---|---|
| N.P | 0 |  |  |  |  |
| $F_1$ | 0 |  | 0 |  |  |
| $F_2$ |  | 0 |  |  | (0) |
| R |  | 0 |  | 0 |  |
FIG. 10

AUTOMATIC TRANSMISSION FOR AUTOMOBILES

BACKGROUND OF THE INVENTION

1. Field of the Invention

This invention relates generally to automatic transmissions for automobiles and more particularly to an automatic transmission combined with an internal combustion engine for vehicles.

2. Description of the Prior Art

An automatic transmission usually comprises a fluid torque converter operatively connected to an internal combustion engine for transmitting torque from the engine to the driving wheels. In cooperation of the torque converter and gear mechanism, the torque generated by the engine is smoothly transmitted in various gear ratios to the driving wheels. However, an automobile with an automatic transmission is said to be less powerful (especially at a standing start) and less fuel efficient compared with an automobile with a manual transmission. This is mainly because the capacity or the efficiency range of the engine is restricted when it is used in combination with the torque converter.

FIG. 1 shows the engine torque curve and torque converter efficiency range wherein lines X and Y indicate the torque converter efficiency range and line Z indicates the available maximum engine torque curve according to its capacity. Without the torque converter, engine torque is available uniformly below curve Z. However, if it is used in combination with the torque converter, the available range is limited to within the area enclosed by the lines X, Y and curve Z. Curve Z indicates the wide open engine throttle condition which means the engine throttle valve is fully open.

The point A is known as "stall point" which shows the condition of the vehicle wherein the brake pedal is depressed with the gear shift range in "Drive" and wherein the engine throttle valve is wide open. From this condition the time of standing start to a quarter mile is measured.

In FIG. 1 the following terms are applicable:

$T_E$: engine torque $N_E$: engine RPM $$e = \text{speed ratio of the torque converter} = \frac{\text{RPM of turbine}}{\text{RPM of impeller}}$$

$T_I$: impeller input torque $N_I$: impeller input RPM

It should also be noted that WOT (original) as shown in FIG. 1 designates a wide open throttle degree.

The fact that an automobile having an automatic transmission has a longer standing start time than one having a manual transmission is based on the following reasoning. In FIG. 1, at stall point A, the horse power valve is only 40 HP although the engine is designed to provide more than 100 HP.

It may be possible for a driver to manually bring the stall point up to the point C (where the horse power is 65 HP) if the vehicle has a manual transmission. It is also possible to use another torque converter (i.e. a more efficient one) so as to raise the stall point. However, in this case the fuel efficiency will be enormously decreased due to "non-matching" of the engine and torque converter capacities. If a less efficient torque converter is used for improving the fuel efficiency, the performance as a whole may decrease due to the same above.

According to the present invention, a gear reduction of continuously variable transmission device is provided between the engine output and torque converter input so as to vary the efficiency range of the torque converter without changing the size of the torque converter itself. Thus, with this gear reduction or continuously variable transmission device, it may be possible to either raise the stall point to point B in FIG. 1 if desired to have the performance of a manual transmission vehicle or to maintain the stall point at A if desired so as to provide improved fuel efficiency. In the latter case, it is possible to replace the engine itself with a smaller one so as to keep the stall point at point A, thus improving the fuel efficiency.

As an example of a conventional device, U.S. Pat. No. 3,739,658 discloses an automatic transmission including a CVT (toric roller type) between the engine and torque converter. However, the engine specifically mentioned in this patent is a gas turbine type which is quite different from the internal combustion type. More particulary the engine power as a function of engine speed of a gas turbine type represents only a line shown on page 34 in FIG. 3.9 of the publication entitled Conceptual Design Study of Improved Automotive Gas Turbine Power Train—Final Report—National Technical Information Service (report by DOE/NASA), pages 30 through 34, published May, 1979 versus the area that the internal combustion engine has as shown in FIG. 1 (i.e. the area below curve Z).

SUMMARY OF THE INVENTION

It is therefore an object of the present invention to provide an improved automatic transmission for an automobile.

It is another object of the invention to provide an improved automatic transmission for an automobile by improving its performance as compared with conventional automatic transmissions.

It is a further object of the invention to provide an automatic transmission for an automobile which has improved fuel efficiency.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 1 is a graph showing an engine torque curve and torque converter efficiency range;

FIG. 2 illustrates the first embodiment of the automatic transmission of present invention;

FIG. 3 is a table showing the operating conditions of the automatic transmission of FIG. 2;

FIG. 7 shows a second embodiment of the present invention;

FIG. 8 is a table showing the operating conditions of the automatic transmission of FIG. 7;

FIG. 9 shows a third embodiment of the present invention; and

FIG. 10 is a table showing the operating conditions of the automatic transmission of FIG. 9.

DETAILED DESCRIPTION OF THE PREFERRED EMBODIMENTS

In accordance with the first embodiment as shown in FIGS. 2 and 3, engine torque is partially transmitted through a manual gear shift and a counter shaft CS to a ring gear of combiner gear mechanism D and the remainder of the torque is transmitted through a continuously variable device CVT and a first clutch $C_1$ to a sun gear of combiner gear mechanism D.

The output member of the combiner gear mechanism D is a carrier thereof which is connected to a fluid torque converter TC through a second clutch $C_2$ and a lock-up clutch $C_c$. The impeller I of the torque converter serves as an input from the combiner gear mechanism D while the turbine T thereof serves as the output of the torque converter. The output of torque converter TC is in turn connected to driving wheels through a conventional differential gear system and axle shafts. FIG. 3 serves to set forth a table which indicates the operating conditions of the aforementioned structural elements of the first embodiment.

Figure 5:
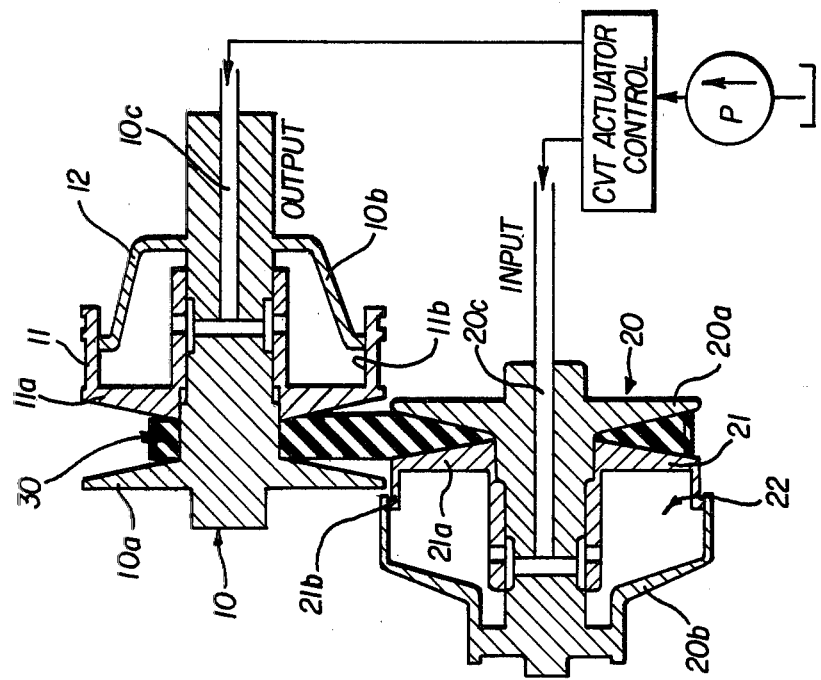
FIG. 5 shows a shifted position of the continuously variable transmission of FIG. 4.
Figure 4:
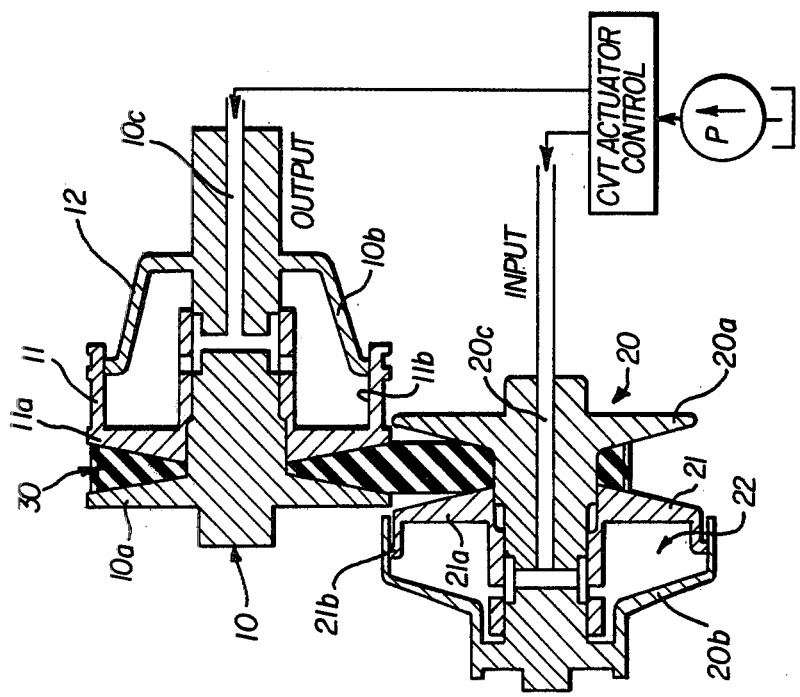
FIG. 4 shows in greater detail the continuously variable transmission of the first embodiment.

The continuously variable device CVT is shown in FIGS. 4 and 5 in greater detail. In FIGS. 4 and 5, reference numeral 10 generally designates an output piston which includes an outer flange portion 10a of an output pulley, piston portion 10b and fluid passage 10c. Reference numeral 11 designates an output cylinder which includes inner flange portion 11a of the output pulley and a cylinder portion 11b on which piston portion 10b is slidable. Reference numeral 12 designates a fluid chamber which is in communication with passage 10c.

Similarly, an input piston 20 includes an outer flange portion 20a of an output pulley, a piston portion 20b and a fluid passage 20c. An input cylinder 21 is also provided and includes an inner flange portion 21a of the output pulley and a cylinder portion 21b on which the piston portion 20b is slidable. Reference numeral 22 designates a fluid chamber which is in fluid communication with passage 20c. The output pulley which includes two flanges 10a and 11a is connected to input pulley through a V-belt 30. Both passages 10c and 20c are connected to an oil pump P through a CVT actuator control which will be explained hereinbelow.

Figure 6:
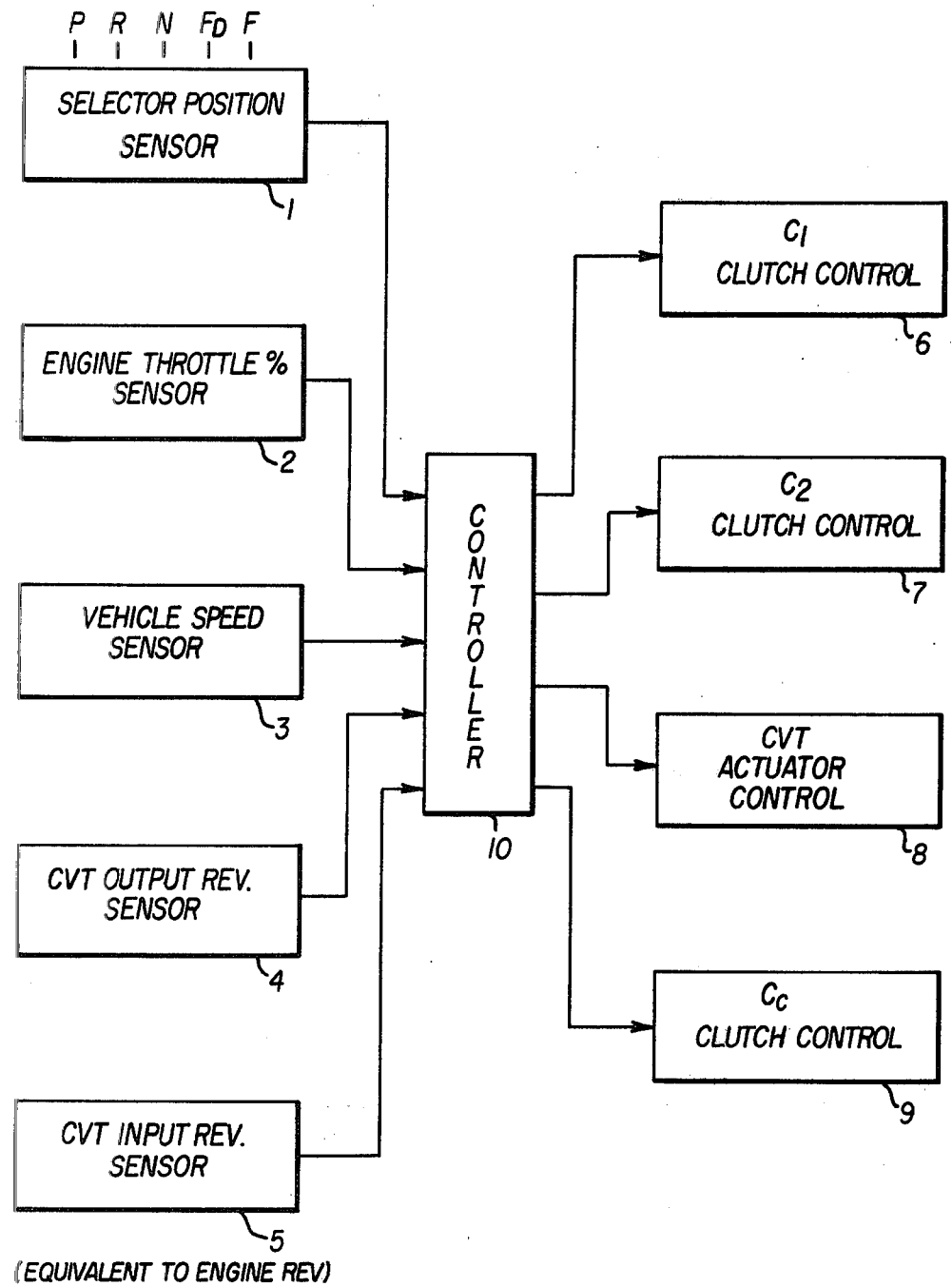
FIG. 6 illustrates the control mechanism for the automatic transmission of FIG. 2.

FIG. 6 shows the control assembly for the automatic transmission of the present invention. Operation of the first embodiment will be explained hereinbelow in more detail with reference to FIGS. 2 through 6. When the engine is started with the speed range being in a neutral position "N", the selector position sensor does not generate any signal. Therefore, all of the clutches $C_1$, $C_2$ and $C_c$ are in an uncoupled condition, which means there is no torque being transmitted to the driving wheels.

When the speed change gear is manually shifted to the "F" range, the controller receives signals from the selector position sensor, engine throttle sensor, vehicle speed sensor and CVT output and input revolution sensors. Thus the controller generates signals in accordance with these signals from the sensors and clutch and CVT actuator controls are selectively actuated accordingly.

If the vehicle is about to be started, then the CVT actuator control is actuated to transmit more hydraulic pressure to the output members including output piston 10, output cylinder 11 and fluid chamber 12. Output cylinder 11 is moved toward the left due to the pressure increase in fluid chamber 12 to thereby increase the effective diameter the output pulley as shown in FIG. 4. At the same time the $C_1$ clutch control is actuated to couple clutch $C_1$ so as to transmit the output power of the CVT to the combiner gear mechanism D.

When the vehicle is started and vehicle speed is increased, then the CVT actuator control receives a signal which indicates the speed gear should be in "$F_1$" (i.e. the second forward speed range). In this case, the CVT actuator control is actuated to provide more pressure to the input members including input piston 20, input cylinder 21 and fluid chamber 22. Input cylinder 21 is moved toward the right by the increased pressure to thereby increase the effective diameter of the input pulley as shown in FIG. 5. The effective diameters of the input and output pulleys are thus variable between the conditions of FIG. 4 and FIG. 5 according to the vehicle speed and degree of opening of the throttle valve.

When the vehicle is running at a constant, relatively high speed, then the $C_1$ clutch control receives a signal corresponding thereto and is actuated so as to uncouple the clutch $C_1$. At the same time the $C_2$ clutch control is actuated to couple the clutch $C_2$ in accordance with a signal from the controller. Thus the engine power is only transmitted from the counter shaft CS, which means the engine torque is transmitted to torque converter input shaft at a 1:1 ratio.

When the gear is shifted to reverse at the "R" position, then the clutch $C_1$ is uncoupled and only the clutch $C_2$ is coupled. Thus, power from the engine is transmitted to the driving wheels through counter shaft CS and torque converter TC. In this case, gear reduction is automatically performed by the torque converter TC. Clutch $C_c$, being a lock-up type clutch, is coupled when the vehicle is desired to be in a direct drive range.

FIG. 7 shows a second embodiment which is different from the first embodiment only with respect to the fact that a speed change shift assembly including a brake member $B_1$ and third clutch $C_3$ is added between the combiner gear mechanism and torque converter TC. FIG. 8 is a table illustrating the mode of operation of the embodiment shown in FIG. 7.

FIG. 9 shows a third embodiment similar to the previous embodiment, wherein only the location of the CVT is different. The torque converter TC is necessary but is omitted from the drawing for ease of illustration and FIG. 10 sets forth a table illustrating the mode of operation of the embodiment shown in FIG. 9.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automatic transmission for vehicles having an internal combustion engine and driving wheels comprising:
   a continuously variable transmission device connected with an engine output for continuously variably transmitting a partial torque in accordance with conditions of vehicle speed and degree of engine throttling;

a counter shaft connected with the engine output and transmitting the remainder of the torque from the engine;

a combiner gear mechanism receiving the torque from the engine through said counter shaft and from said continuously variable transmission device;

a fluid torque converter for converting torque from the combiner gear mechanism and transmitting the torque to said driving wheels;

reverse drive means interposed between said engine and said torque converter for reversely transmitting the torque from the engine to said driving wheels;

a first clutch operatably interconnecting said continuously variable transmission and said combiner gear mechanism; and a second clutch and third clutch operatively interconnecting said combiner gear with said torque converter.

2. An automatic transmission as set forth in claim 1, said reverse means comprising a gear mechanism connected with said counter shaft.

3. An automatic transmission as set forth in claim 1, said reverse means comprising brake means operatively connected between said combiner gear mechanism and said torque converter.

4. An automatic transmission as set forth in claim 1, further comprising:
  a fourth clutch interconnecting said combiner gear mechanism and said third clutch; and
  a brake member operatively associated with said fourth clutch.

5. An automatic transmission as set forth in claim 1, further comprising:
  a driving mechanism;
  a first clutch interconnecting said counter shaft and said driving mechanism;
  a second and fourth clutch and a third clutch interconnecting said driving mechanism with said torque converter; and
  a brake member operatively associated with said fourth clutch.

6. An automatic transmission as set forth in claim 1, further comprising control means including;
  sensor means for detecting a plurality of engine operational conditions and for emitting signals corresponding thereto; and
  controller means for receiving said signals and emitting signals controlling operation of said automatic transmission.

7. An automatic transmission as set forth in claim 6, said control means further comprising:
  means for controlling said first and second clutches and wherein said continuously variable transmission device is operatively associated with said controller means for receiving said signals emitted therefrom.

8. An automatic transmission as set forth in claim 1, said continuously variable device further comprising:
  first and second piston members;
  first and second pulley members operatively associated with said first and second piston members;
  a belt member interconnecting said first and second pulley members; and
  means for increasing and decreasing the effective diameter of said first and second pulley members.

* * * * *